United States Patent
Peng et al.

(10) Patent No.: US 9,590,759 B1
(45) Date of Patent: Mar. 7, 2017

(54) BI-DIRECTIONAL COMPACT COARSE WAVELENGTH DIVISION MULTIPLEXING HAVING A DISPERSIONLESS BI-DIRECTIONAL TAP

(71) Applicant: Alliance Fiber Optic Products, Inc., Sunnyvale, CA (US)

(72) Inventors: Xiaotao Peng, Fremont, CA (US); Andy Fenglei Zhou, Fremont, CA (US); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 303 days.

(21) Appl. No.: 14/332,387

(22) Filed: Jul. 16, 2014

Related U.S. Application Data (60) Provisional application No. 61/958,285, filed on Jul. 25, 2013.

(51) Int. Cl.
  *H04J 14/02* (2006.01)
  *H04B 10/25* (2013.01)

(52) U.S. Cl.
  CPC .......... *H04J 14/02* (2013.01); *H04B 10/2503* (2013.01); *H04J 14/0208* (2013.01)

(58) Field of Classification Search
  CPC .................................................. H04J 14/0208
  See application file for complete search history.

(56) References Cited

U.S. PATENT DOCUMENTS

| | | | | |
|---|---|---|---|---|
| 4,373,775 | A * | 2/1983 | Gasparian | G02B 6/29361 385/47 |
| 5,657,155 | A | 8/1997 | Cheng | |
| 6,111,676 | A * | 8/2000 | Lemus | H04B 10/071 398/1 |
| 6,546,168 | B1 | 4/2003 | Xie et al. | |
| 6,744,946 | B2 | 6/2004 | Kikinis | |
| 6,748,133 | B2 | 6/2004 | Liu et al. | |
| 6,792,210 | B1 * | 9/2004 | Hallock | G02B 6/29364 398/45 |
| 8,582,975 | B2 | 11/2013 | Nagarajan et al. | |
| 2002/0057868 | A1 * | 5/2002 | Wu | G02B 6/29367 385/24 |
| 2003/0099434 | A1 * | 5/2003 | Liu | G02B 6/29367 385/31 |
| 2004/0052529 | A1 * | 3/2004 | Lauder | H04J 14/02 398/82 |
| 2004/0190821 | A1 * | 9/2004 | Enea | H04J 14/02 385/24 |
| 2004/0208582 | A1 * | 10/2004 | Lemoff | H04J 14/02 398/85 |
| 2013/0101254 | A1 * | 4/2013 | Cai | G02B 6/29395 385/47 |

* cited by examiner

*Primary Examiner* — Charlie Y Peng
(74) *Attorney, Agent, or Firm* — Dinsmore & Shohl LLP

(57) ABSTRACT

A bi-directional multiplexer/demultiplexer comprises a common port, an upgrade (UPG) port, a plurality of input/output ports, a plurality of wavelength division multiplexing (WDM) filters arranged in a zig-zag fashion, and a single bi-directional tap. The single bi-directional tap directs a tapped signal to a demultiplexing tap port in demultiplexing mode and a multiplexing tap port in multiplexing mode. The bi-directional tap may be a thin-film tap filter.

15 Claims, 11 Drawing Sheets

PRIOR ART

BI-DIRECTIONAL COMPACT COARSE WAVELENGTH DIVISION MULTIPLEXING HAVING A DISPERSIONLESS BI-DIRECTIONAL TAP

CROSS-REFERENCE TO RELATED APPLICATIONS

This application claims the benefit to U.S. Provisional Application No. 61/958,285, filed Jul. 25, 2013.

FIELD OF THE INVENTION

This invention relates to bi-directional compact coarse wavelength division multiplexing (CWDM) and mote specifically to bi-directional compact CWDM having a dispersionless bi-directional tap.

BACKGROUND OF THE INVENTION

Compact Coarse Wavelength Division Multiplexing (CWDM) has been widely deployed in Telecom, such as Metro core network and Metro access network, for multiple wavelength signals transportation in the network so as to increase the bandwidth, due to its compact dimension and advantages in term of low insertion loss and low temperature dependent loss.

On the other hand, a tapping function is very important for a flexible and versatile network having monitoring and debugging functions in nowadays high speed network due to greatly increased video demand, social networking, big data, and cloud computing. Traditionally, fused couplers are used to perform the tapping function. The tapping function to meet the increasingly higher speed requirement (for example above 10 Gbps) needs low mode dispersion in the optical transportation network. In this scenario, fused couplers cannot fulfill the requirement. Fused couplers suffer from mode dispersion in a high speed network.

Furthermore, a fused coupler typically performs uni-directional tapping. For uni-directional tapping, the signal flow direction is fixed in the network. In multiplexing and demultiplexing, the signal flow directions are opposite to each other. Multiplexing and demultiplexing modes are not exchangeable in a uni-directional CWDM network. However, multiplexing and demultiplexing modes are exchangeable in a bi-directional (BiDi) CWDM network. In nowadays flexible and versatile networks, a BiDi CWDM network having bi-directional tapping is greatly needed. Accordingly, bi-directional and low-dispersion or dispersionless taps for BiDi CWDM are in demand. In the disclosure, low-dispersion refers to low mode dispersion, and dispersionless refers to mode-dispersionless.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
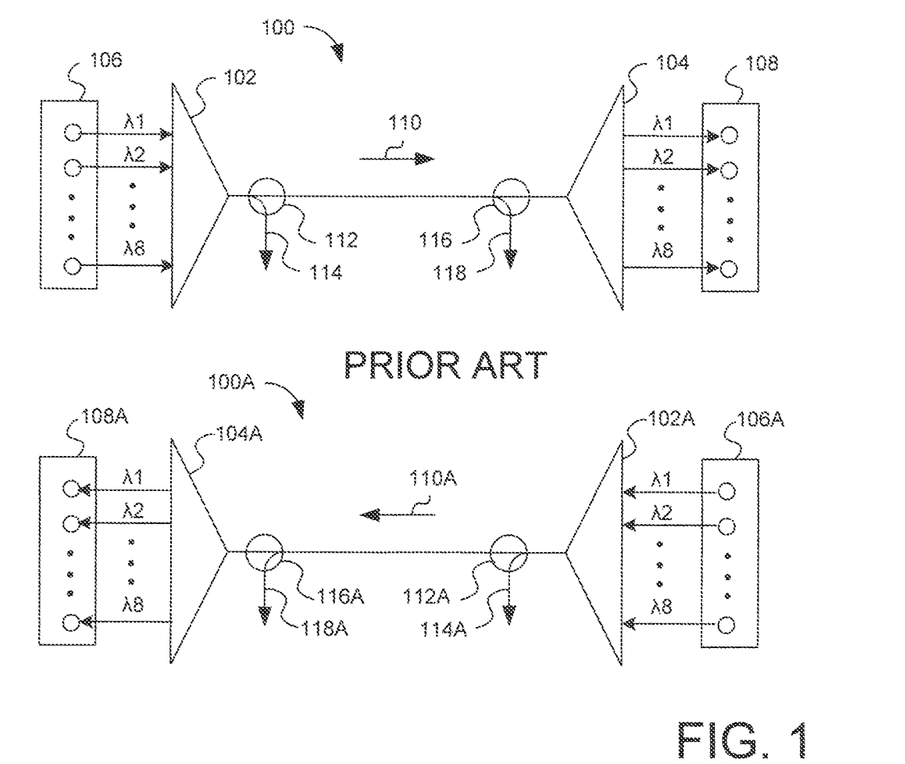
FIG. 1 shows a prior art uni-directional CWDM network.

FIG. 1 shows a prior art uni-directional CWDM network 100 including a multiplexer (Mux) 102 and a demultiplexer (DeMux) 104. Mux 102 is coupled to a set of transmitters 106, and DeMux 104 is coupled to a set of receivers 108. A multiplexed signal 110 flows from left (Mux 102) to right (DeMux 104). For monitoring multiplexed signal 110 outputted from Mux 102, a first tap 112 is coupled to Mux 102. For example, tap 112 is a fused coupler. A first tap signal 114 is tapped from tap 112. For monitoring multiplexed signal 110 entering DeMux 104, a second tap 116 is coupled to DeMux 104. For example, tap 116 is a fused coupler. A second tap signal 118 is tapped from tap 116.

FIG. 1 also shows a prior art reversed uni-directional CWDM network 100A of uni-directional CWDM network 100 including a multiplexer (Mux) 102A and a demultiplexer (DeMux) 104A. Mux 102A is coupled to a set of transmitters 106A, and DeMux 104A is coupled to a set of receivers 108A. A multiplexed signal 110A flows from right (Mux 102A) to left (DeMux 104A). Multiplexed signal 110A flows in an opposite direction to the flow of multiplexed signal 110. For monitoring multiplexed signal 110A outputted from Mux 102A, a first tap 112A is coupled to Mux 102A. For example, tap 112A is a fused coupler, which is similar but opposite to tap 112. A first tap signal 114A is tapped from tap 112A. For monitoring multiplexed signal 110A entering DeMux 104A, a second tap 116A is coupled to DeMux 104A. For example, tap 116A is a fused coupler, which is similar but opposite to tap 116. A second tap signal 118A is tapped from tap 116A.

Tap 112 and tap 112A are fused couplers, which are uni-directional. Accordingly, tap 112 cannot tap multiplexed signal 110, if multiplexed signal 110 flows from right to left. Similarly, tap 112A cannot tap multiplexed 114A, if multiplexed signal 110A flows from left to right. In other words, prior art uni-directional CWDM network 100 having two uni-directional fused couplers 112 and 116 may not be effectively applied to bi-directional (BiDi) CWDM.

Figure 2:
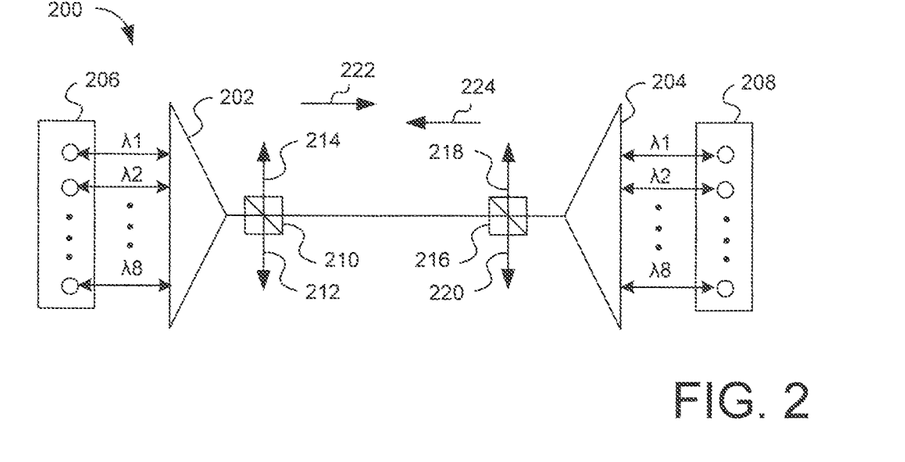
FIG. 2 shows a bi-directional (BiDi) CWDM network.

FIG. 2 shows a BiDi CWDM network 200 including a first bi-directional multiplexer and demultiplexer (BiDi Mux/DeMux) 202 and a second BiDi Mux/DeMux 204 in accordance with an embodiment of the invention. First BiDi Mux/DeMux 202 is coupled to a first set of BiDi transceivers 206. Second BiDi Mux/DeMux 204 is coupled to a second set of BiDi transceivers 208. A first multiplexed signal 222 may flow from left to right, and a second multiplexed signal 224 may flow from right to left, depending on the status of BiDi CWDM 200.

A first BiDi tap 210 is coupled to first BiDi Mux/DeMux 202. For monitoring first multiplexed signal 222 outputted from first BiDi Mux/DeMux 202, for example, a tap signal 212 may be reflected downward by BiDi tap 210. For monitoring second multiplexed signal 224 entering first BiDi Mux/DeMux 202, for example, a tap signal 214 may be reflected upward by BiDi tap 210.

A second BiDi tap 216 is coupled to second BiDi Mux/DeMux 204. For monitoring second multiplexed signal 224 outputted from second BiDi Mux/DeMux 204, for example, a tap signal 218 may be reflected upward by BiDi tap 216. For monitoring first multiplexed signal 222 entering second BiDi Mux/DeMux 204, for example, a tap signal 220 may be reflected downward by tap BiDi 216.

Figure 3:
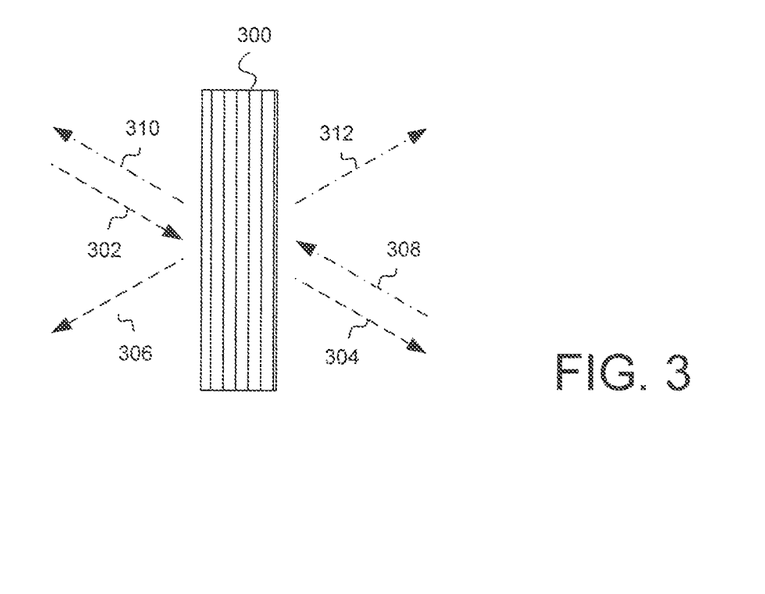
FIG. 3 shows a bi-directional dispersionless thin-film tap filter.

For example, first and second BiDi taps, 210 and 216, may be made of a thin-film tap filter. A thin-film tap filter 300, which may be used for BiDi CWDM, is schematically shown in FIG. 3 in accordance with an embodiment of the invention. An incoming beam 302 is incident to thin-film tap filter 300. The incoming beam is partially transmitted as a transmitted beam 304 and partially reflected as a reflected beam 306. The ratio of the powers of transmitted beam 304 and reflected beam 306 may be determined in the design of thin-film tap filter 300. Reflected beam 306 may be used as a tap signal. Alternatively, transmitted beam 304 may be used as a tap signal. The power of the tapped signal may be ranging from 1% to 99% of the incoming beam or signal. Thin-film tap filter 300 may tap a dispersionless tapped signal independent of the power ratio of the tapped signal.

If an incoming beam 308 is incident to thin-film tap filter 300 from an opposite direction of incoming beam 302, the beam is partially transmitted as a transmitted beam 310 and partially reflected as reflected beam 312. Transmitted beam 310 is parallel to incoming beam 302 but has opposite direction. Reflected beam 312 is parallel to reflected beam 306 but has opposite direction. Reflected beam 312 may be used as a tap signal. Alternatively, transmitted beam 310 may be used as a tap signal.

Uni-directional and multi-channel uni-directional dispersionless thin-film tap filters are described in a co-pending patent application Ser. No. 13/913,480, filed on Jun. 9, 2013, entitled "Dispersionless multimode optical tap filter for high-speed data communications", assigned to the same assignee, which is incorporated herein by reference. However, a bi-directional dispersionless thin-film tap filter having two incoming beams from opposite directions is not disclosed in the mentioned patent application.

Figure 4:
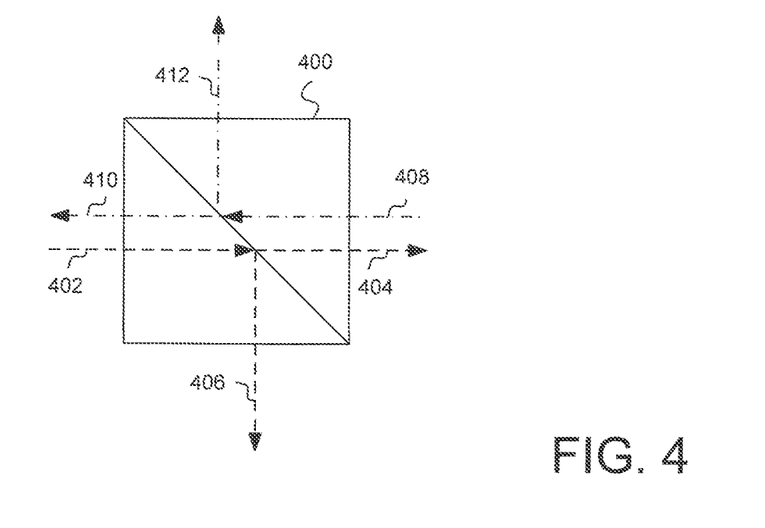
FIG. 4 shows a cubic beamsplitter for bi-directional tapping.

For example, a beamsplitter (BS) 400 may also be used for BiDi CWDM as schematically shown in FIG. 4 in accordance with an embodiment of the invention. An incoming beam 402 is incident to BS 400. The incoming beam is partially transmitted as a transmitted beam 404 and partially reflected downward as a reflected beam 406. The ratio of the powers of transmitted beam 404 and reflected beam 406 may be determined in the design of BS 400. Reflected beam 406 may be used as a tap signal. Alternatively, transmitted beam 404 may be used as a tap signal.

If an incoming beam 408 is incident to BS 400 from an opposite direction of incoming beam 402, the incoming beam is partially transmitted as a transmitted beam 410 and partially reflected upward as reflected beam 412. Transmitted beam 410 is parallel to incoming beam 402 but has opposite direction. Reflected beam 412 is parallel to reflected beam 406 but has opposite direction. Reflected beam 412 may be used as a tap signal. Alternatively, transmitted beam 410 may be used as a tap signal. It is appreciated that a half-mirror may replace a cubic beamsplitter such as BS 400 to function as a BiDi tap as well.

Figures 5, 5A:
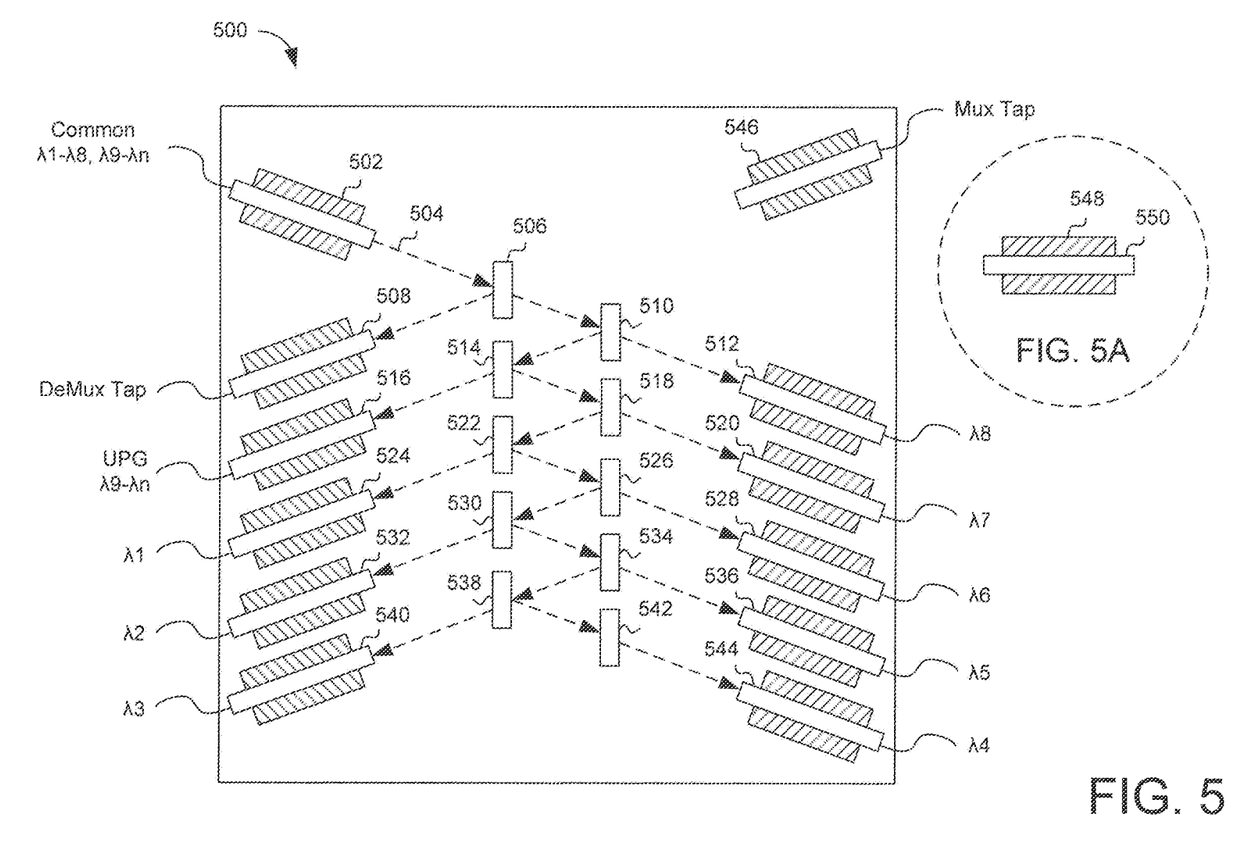
FIG. 5 shows a BiDi multiplexer/demultiplexer (Mux/DeMux) in demultiplexing mode.
FIG. 5A shows a port of BiDi Mux/DeMux comprising a fiber collimator and a fiber.

FIG. 5 shows a BiDi Mux/DeMux 500 capable of tapping a DeMux tap signal in demultiplexing mode and a Mux tap signal in multiplexing mode in accordance with an embodiment of the invention. BiDi Mux/DeMux 500 includes a common port 502. In demultiplexing mode, common port 502 receives a multiplexed signal 504. for example, having eight channels $\lambda 1$-$\lambda 8$ and additional (n-8) channels $\lambda 9$-$\lambda n$. Channels $\lambda 1$-$\lambda 8$ are outputted from $\lambda 1$-$\lambda 8$ I/O (input/output) ports, respectively. Additional (n-8) channels $\lambda 9$-$\lambda n$ are outputted together from a UPG (upgrade) port for further demultiplexing or a possible second stage of demultiplexing. A DeMux tap signal having all channels $\lambda 1$-$\lambda n$ is outputted from a DeMux tap port.

In demultiplexing mode, multiplexed signal 504 is directed to a BiDi tap, for example, a thin-film tap filter 506. A BiDi tap may also be a cubic beamsplitter or a half-mirror. Incoming multiplexed signal 504 is partially reflected by thin-film tap filter 506 to a DeMux tap port 508 and partially transmitted to a wavelength division multiplexing (WDM) filter 510. The reflected multiplexed signal 504 by thin-film tap filter 506 is a DeMux tap signal.

WDM filter 510 selectively transmits channel $\lambda 8$ to $\lambda 8$ I/O port 512, and reflects the rest of the multiplexed signal to a WDM filter 514. WDM filter 514 selectively transmits the multiplexed signal having (n-8) channels $\lambda 9$-$\lambda n$ to a UPG port 516 and reflects the rest of the multiplexed signal to a WDM filter 518. The signal exiting from UPD port 516 may be used for further demultiplexing or a second stage of demultiplexing. WDM filter 518 selectively transmits channel $\lambda 7$ to $\lambda 7$ I/O port 520 and reflects the rest of the multiplexed signal to a WDM filter 522. WDM filter 522 selectively transmits channel $\lambda 1$ to $\lambda 1$ I/O port 524 and reflects the rest of the multiplexed signal to a WDM filter 526. WDM litter 526 selectively transmits channel $\lambda 6$ to $\lambda 6$ I/O port 528 and reflects the rest of the multiplexed signal to a WDM filter 530. WDM filter 530 selectively transmits channel $\lambda 2$ to $\lambda 2$ I/O port 532 and reflects the rest of the multiplexed signal to a WDM filter 534. WDM filter 534 selectively transmits channel λ5 to λ5 I/O port 536 and reflects the rest of the multiplexed signal to a WDM filter 538. WDM filter 538 selectively transmits channel λ3 to λ3 I/O port 540 and reflects the rest of the multiplexed signal to a WDM filter 542. WDM filter 542 selectively transmits channel λ4 to λ4 I/O port 544. WDM filter 542 is optional, since the signal coming to it contains channel λ4 only.

A BiDi tap directs a DeMux tap signal tapped from an incoming signal from a common port to a DeMux tap port. After tapping DeMux tap signal using a BiDi tap, the remaining signals go through WDM filters arranged in a zig-zag fashion. A WDM filter selects a channel for each input/output port. An input/output port outputs a channel selected by the WDM filter.

As shown schematically in FIG. 5A, a port of BiDi Mux/DeMux 500 comprises a fiber collimator 548 and a fiber 550, in accordance with an embodiment of the invention. Fiber collimators, thin-film tap filter, and/or WDM filters may be fixed on substrate by wedges as described in U.S. Pat. No. 6,748,133, which is assigned to the same assignee, and which is incorporated herein by reference.

Figure 6:
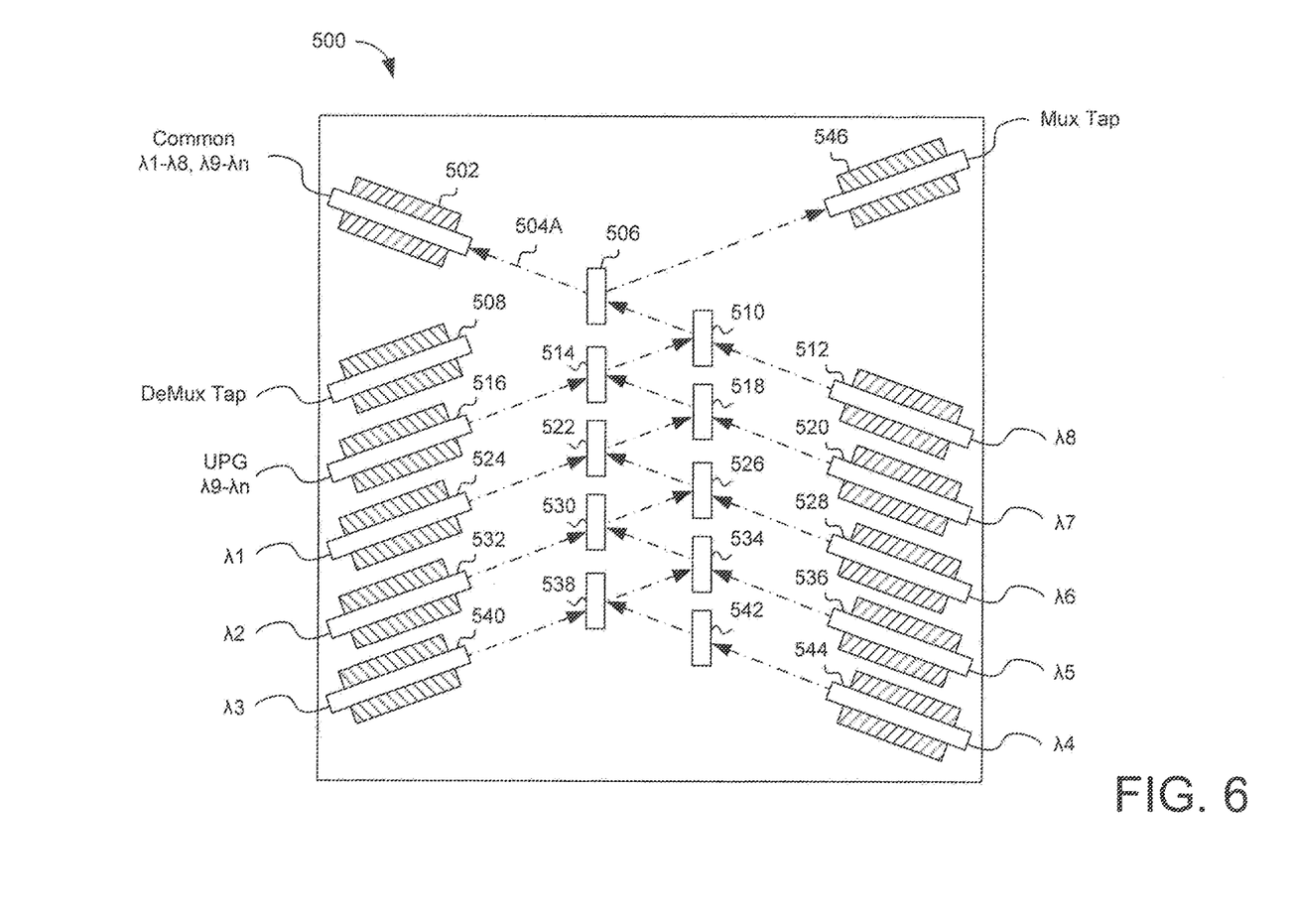
FIG. 6 shows the BiDi Mux/DeMux of FIG. 5 in multiplexing mode.

FIG. 6 shows BiDi Mux/DeMux 500 of FIG. 5 in multiplexing mode in accordance with an embodiment of the invention. Channels λ1-λ8 are inputted from λ1-λ8 I/O ports, respectively. Additional multiplexed (n-8) channels λ9-λn are inputted from a UPG port. Common port 502 outputs a multiplexed signal 504A, for example, having eight channels λ1-λ8 and additional (n-8) channels λ9-λn. A Mux tap signal having all channels λ1-λn is outputted from a Mux tap port.

In multiplexing mode, WDM filter 538 multiplexes, i.e., combines, channel λ4 from λ4 I/O port 544 passing through optional WDM filter 542 and channel λ3 from λ3 I/O port 540. WDM filter 534 multiplexes the multiplexed channels λ3-λ4 and channel λ5 from λ5 I/O port 536. WDM filter 530 multiplexes the multiplexed channels λ3-λ5 and channel λ2 from λ2 I/O port 532. WDM filter 526 multiplexes the multiplexed channels λ2-λ5 and channel λ6 from λ6 I/O port 528. WDM filter 522 multiplexes the multiplexed channels λ2-λ6 and channel λ1 from λ1 I/O port 524. WDM filter 518 multiplexes the multiplexed channels λ1-λ6 and channel λ7 from λ7 I/O port 520. WDM fitter 514 multiplexes the multiplexed channels λ1-λ7 and the multiplexed channels λ9-λn from UPG port 516. WDM filter 510 multiplexes the multiplexed channels λ1-λ7, λ9-λn and channel λ8 from λ8 I/O port 512. The multiplexed channels λ1-λn is directed to thin-film tap filter 506. The incoming signal having multiplexed channels λ1-λn is partially reflected by thin-film tap filter 506 to a Mux tap port 546. The multiplexed signal reflected by thin-film tap filter 506 is a Mux tap signal. Mux tap port 546 outputs a Mux tap signal having all channels λ1-λn. Thin-film tap filter 506 partially transmits multiplexed signal 504A having all channels λ1-λn to common port 502. Common port 502 outputs multiplexed signal 504A.

Before tapping Mux tap signal using a BiDi tap, channels from input/output ports are combined by WDM filters arranged in a zig-zag fashion. A WDM filter adds a channel from each input/output port. An input/output port inputs a channel, which is directed to a WDM filter. The BiDi tap directs a Mux tap signal tapped from an incoming signal combined by the WDM filters to a Mux tap port.

It is appreciated that the BiDi Mux/DeMux 500 shown in FIGS. 5 and 6 comprises a single BiDi tap 506. Single BiDi tap 506 directs a tapped signal to DeMux tap port 508 in demultiplexing mode and Mux tap port 546 in multiplexing mode.

Figure 7:
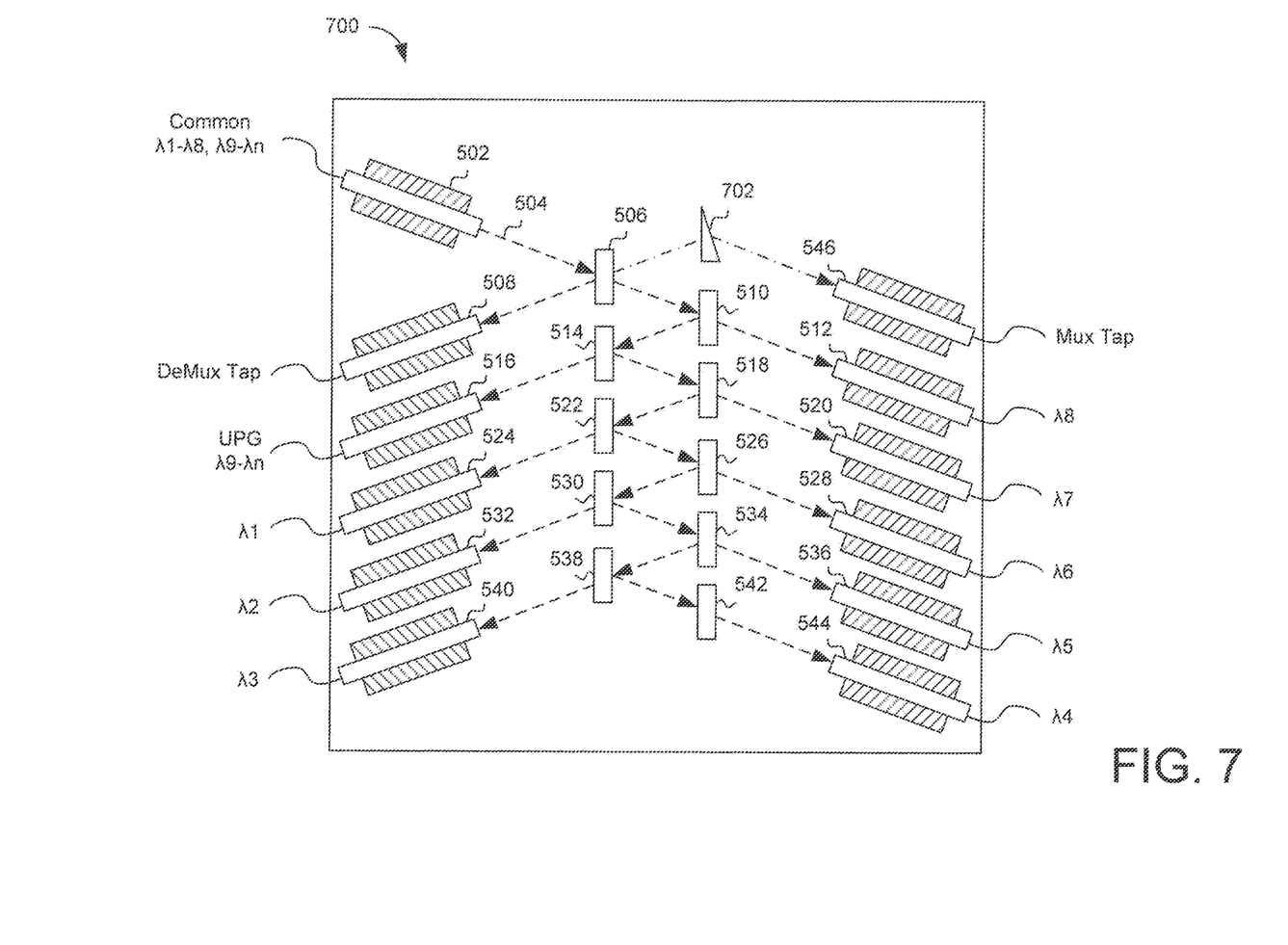
FIG. 7 shows a BiDi Mux/DeMux having a wedge prism.

FIG. 7 shows a BiDi Mux/DeMux 700 nearly identical to BiDi Mux/DeMux 500 of FIGS. 5 and 6 in accordance with an embodiment of the invention. For brevity, detailed descriptions of identical portions are omitted. The difference of FIG. 7 from FIGS. 5 and 6 is that BiDi Mux/DeMux 700 comprises a wedge prism 702 to bend the light path of the Mux tap signal directed from BiDi tap 506 to Mux tap port 546, such that Mux tap port 546 may be aligned to be parallel to λ4-λ8 I/O ports 544, 536, 528, 520, 512. This may optimize fiber routing for integration.

Figure 8:
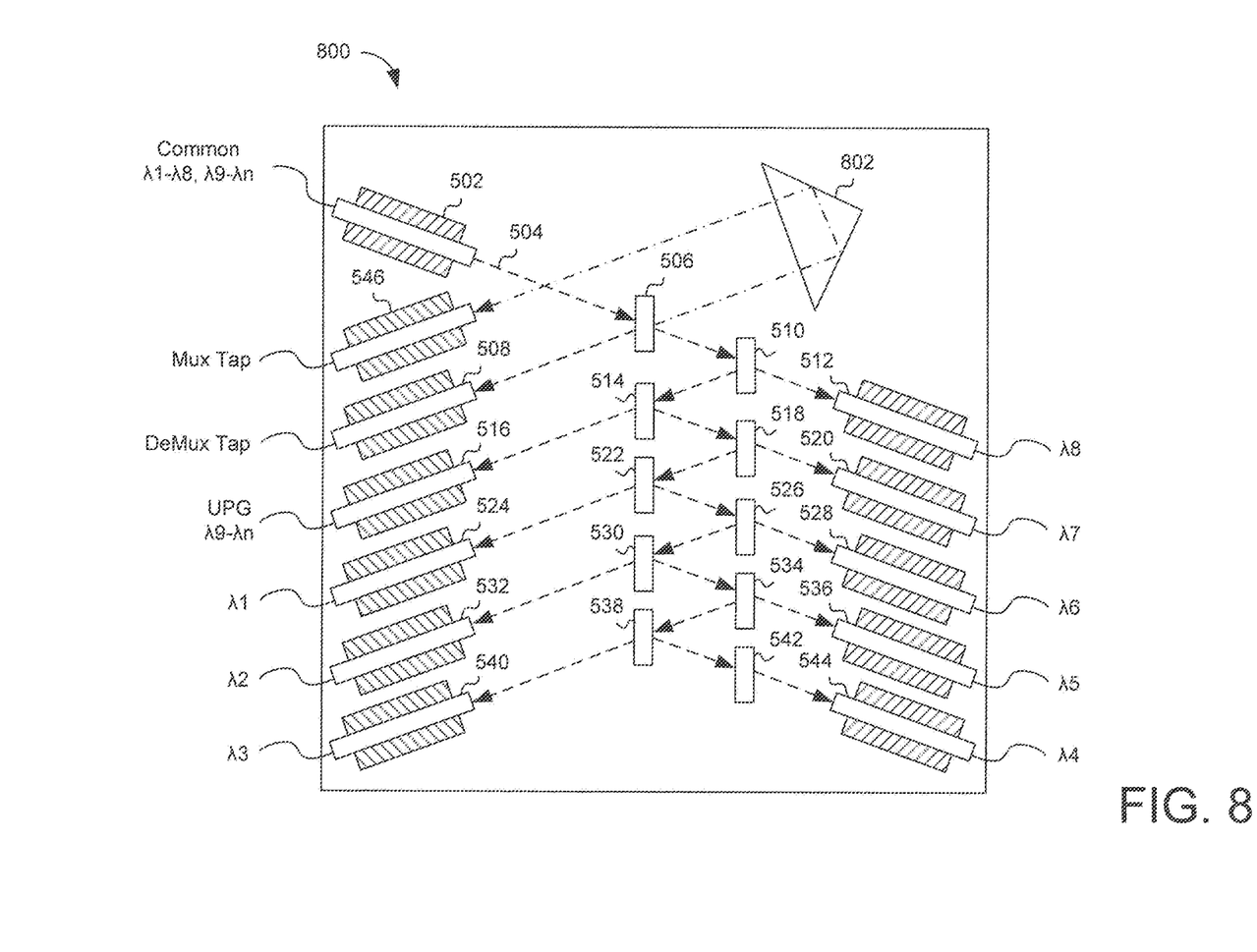
FIG. 8 shows a BiDi Mux/DeMux having a twice reflecting prism.

FIG. 8 shows a BiDi Mux/DeMux 800 nearly identical to BiDi Mux/DeMux 500 of FIGS. 5 and 6 in accordance with an embodiment of the invention. For brevity, detailed descriptions of identical portions are omitted. The difference of FIG. 8 from FIGS. 5 and 6 is that BiDi Mux/DeMux 800 comprises a prism 802 to reflect twice the light path of the Mux tap signal directed from BiDi tap 506 to Mux tap port 546, such that Mux tap port 546 may be disposed next to DeMux tap 508 and aligned parallel to DeMux tap port 508, UPG port 516, and λ1-λ3 I/O ports 524, 532, 540. This may benefit that Mux tap port and DeMux tap port are on the same side with the common port. In some application, Mux tap port and DeMux tap port need to be as close as possible for integration in sub-module system.

Figure 9:
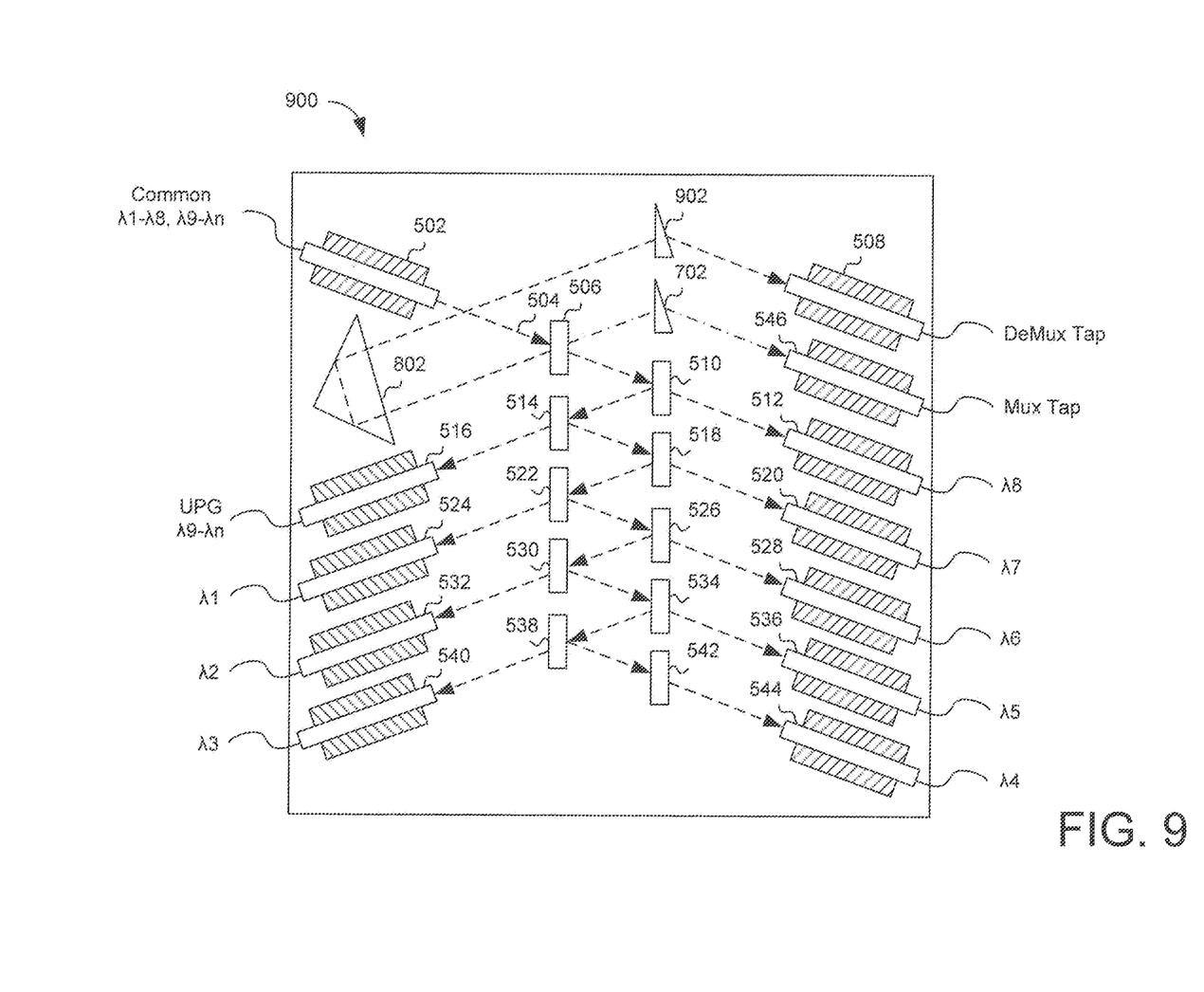
FIG. 9 shows a BiDi Mux/DeMux having two wedge prisms and a twice reflecting prism.

FIG. 9 shows a BiDi Mux/DeMux 900 nearly identical to BiDi Mux/DeMux 500 of FIGS. 5 and 6 in accordance with an embodiment of the invention. For brevity, detailed descriptions of identical portions are omitted. The difference of FIG. 9 from FIGS. 5 and 6 is that BiDi Mux/DeMux 900 comprises a wedge prism 702 to bend the Mux tap signal directed from BiDi tap 506 to Mux tap port 546, such that Mux tap port 546 may be aligned parallel to λ4-λ8 I/O ports 544, 536, 528, 520, 512, a prism 802 to reflect twice the DeMux tap signal directed from BiDi tap 506 to DeMux tap port 50, such that DeMux tap port 508 may be disposed next to Mux tap port 546 on the side opposite to the common port, and a wedge prism 902 to bend the twice reflected DeMux tap signal, such that DeMux tap port 508 may be aligned parallel to Mux tap port 546 and λ4-λ8 I/O ports 544, 536, 528, 520, 512. This may benefit integration of compact CWDM with dual taps in a module.

Figure 10:
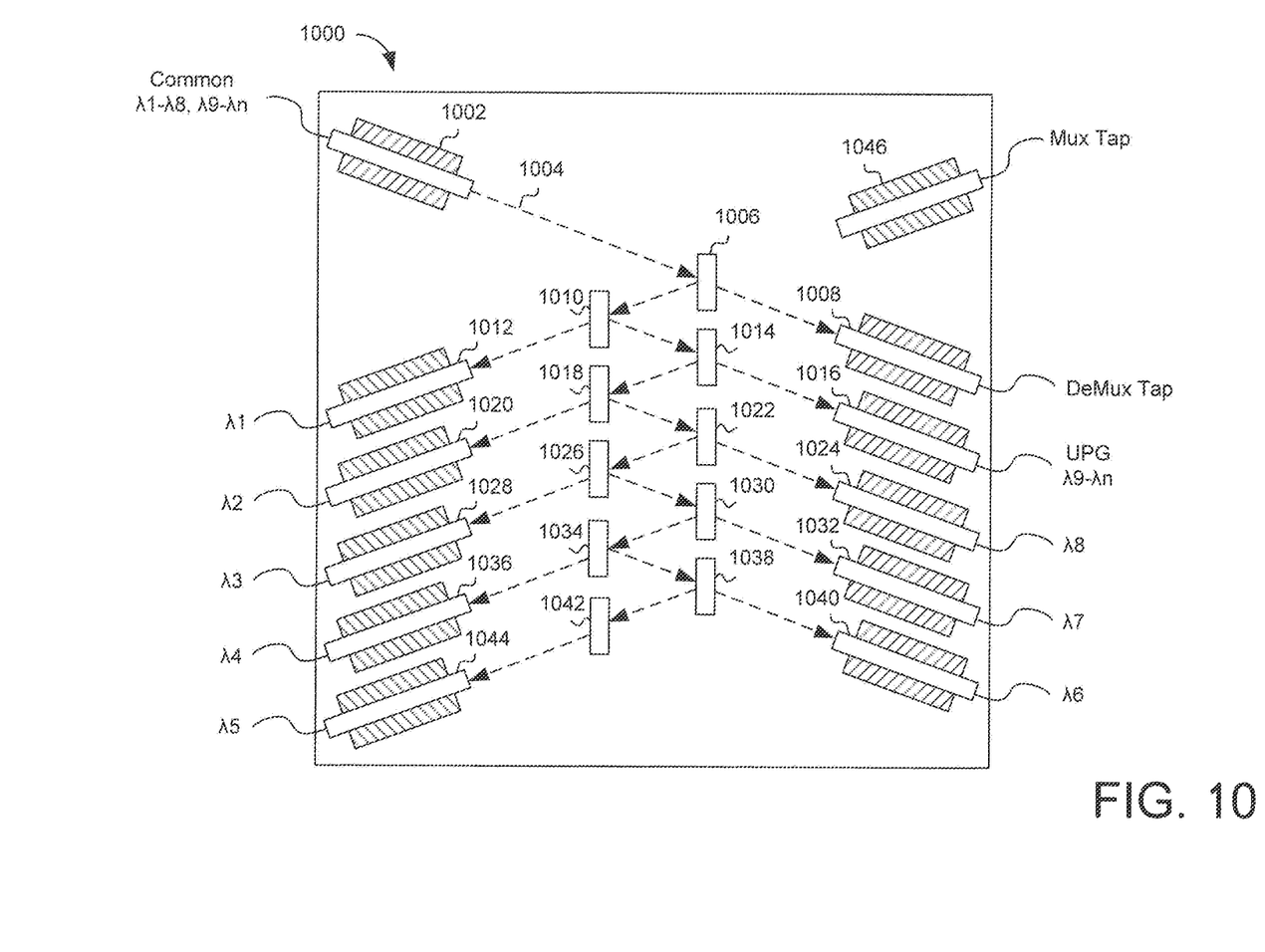
FIG. 10 shows a BiDi Mux/DeMux in demultiplexing mode.

Referring back to FIG. 3, transmitted beam 304 and transmitted beam 310 may also be used as tap signals. FIG. 10 shows a BiDi Mux/DeMux 1000 using a transmitted beam through a thin-film tap filter 1006 as a tap signal, in accordance with an embodiment of the invention. FIG. 10 shows BiDi Mux/DeMux 1000 in demultiplexing mode.

BiDi Mux/DeMux 1000 includes a common port 1002. In demultiplexing mode, common port 1002 receives a multiplexed signal 1004, for example, having eight channels λ1-λ8 and additional (n-8) channels λ9-λn. Channels λ1-λ8 are outputted from λ1-λ8 I/O ports, respectively. Additional (n-8) channels λ9-λn are outputted together from a UPG port for further demultiplexing or a possible second stage of demultiplexing. A DeMux tap signal having all channels λ1-λn is outputted from a DeMux tap port.

Multiplexed signal 1004 is directed to a thin-film tap filter 1006. Incoming multiplexed signal 1004 is partially transmitted through thin-film tap filter 1006 to a DeMux tap port 1008 and partially reflected to a WDM filter 1010. WDM filter 1010 selectively transmits channel λ1 to λ1 I/O port 1012, and reflects the rest of the multiplexed signal to a WDM filter 1014. WDM filter 1014 selectively transmits the multiplexed signal having (n-8) channels λ9-λn to a UPG port 1016 and reflects the rest of the multiplexed signal to a WDM filter 1018. The signal exiting from UPD port 1016 may be used for further demultiplexing or a second stage of demultiplexing. WDM filter 1018 selectively transmits channel λ2 to λ2 I/O port 1020 and reflects the rest of the multiplexed signal to a WDM filter 1022. WDM filter 1022 selectively transmits channel λ8 to λ8 I/O port 1024 and reflects the rest of the multiplexed signal to a WDM filter 1026. WDM filter 1026 selectively transmits channel λ3 to λ3 I/O port 1028 and reflects the rest of the multiplexed signal to a WDM filter 1030. WDM filter 1030 selectively transmits channel λ7 to λ7 I/O port 1032 and reflects the rest of the multiplexed signal to a WDM filter 1034. WDM filter 1034 selectively transmits channel λ4 to λ4 I/O port 1036 and reflects the rest of the multiplexed signal to a WDM filter 1038. WDM filter 1038 selectively transmits channel λ6 to λ6 I/O port 1040 and reflects the rest of the multiplexed signal to a WDM filter 1042. WDM filter 1042 selectively transmits channel λ5 to λ5 I/O port 1044. WDM filter 1042 is optional, since the signal coming to it contains channel λ5 only.

Figure 11:
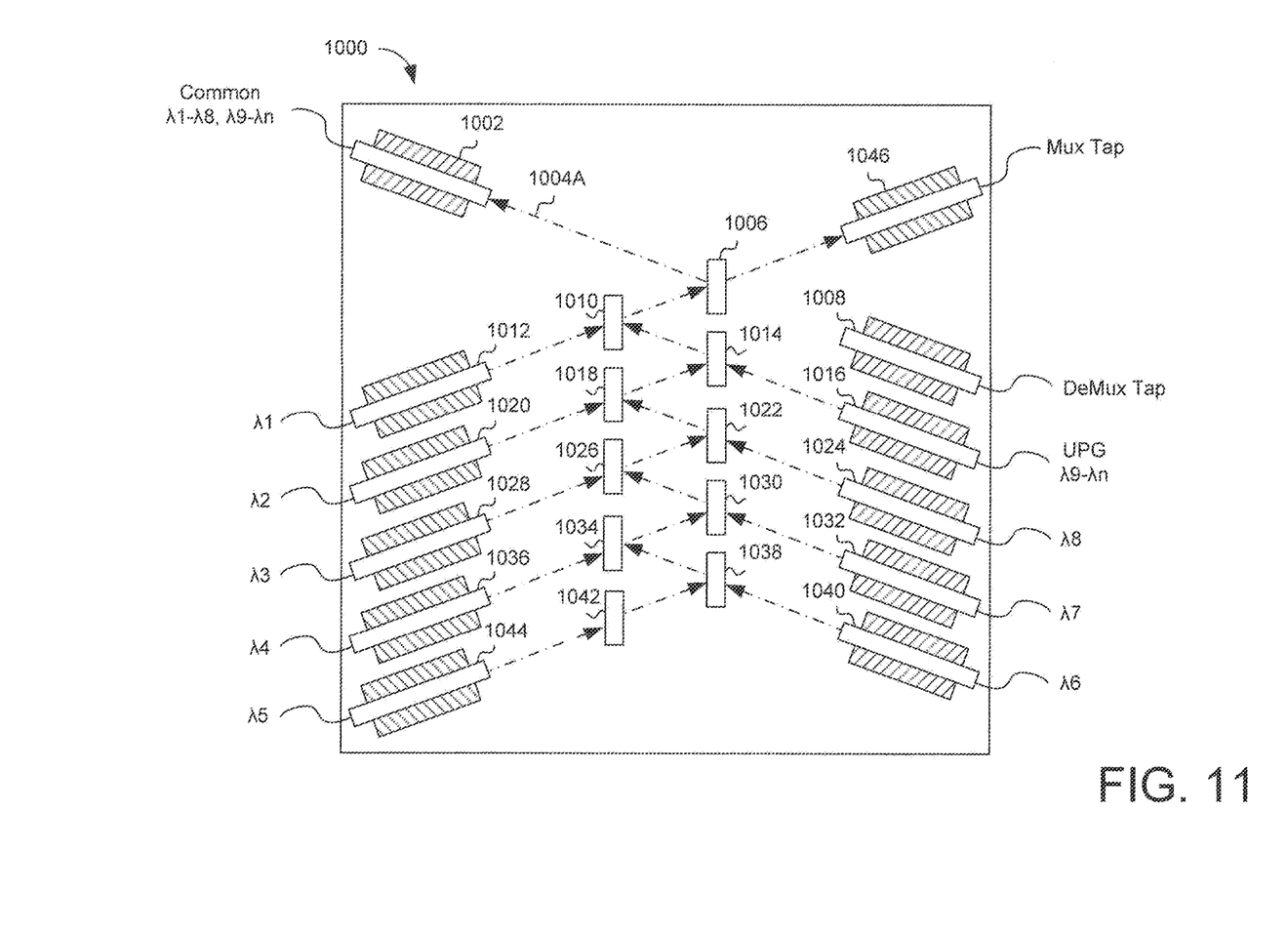
FIG. 11 shows the BiDi Mux/DeMux of FIG. 10 in multiplexing mode.

FIG. 11 shows BiDi Mux/DeMux 1000 of FIG. 10 in multiplexing mode in accordance with an embodiment of the invention. WDM filter 1038 multiplexes, i.e., combines, channel λ5 from λ5 I/O port 1044 passing through optional WDM filter 1042 and channel λ6 from λ6 I/O port 1040. WDM filter 1034 multiplexes the multiplexed channels λ5-λ6 and channel λ4 from λ4 I/O port 1036. WDM filter 1030 multiplexes the multiplexed channels λ4-λ6 and channel λ7 from λ7 I/O port 1032. WDM filter 1026 multiplexes the multiplexed channels λ4-λ7 and channel λ3 from λ3 I/O port 1028. WDM filter 1022 multiplexes the multiplexed channels λ3-λ7 and channel λ8 from λ8 I/O port 1024. WDM filter 1018 multiplexes the multiplexed channels λ3-λ8 and channel λ2 from λ2 I/O port 1020. WDM filter 1014 multiplexes the multiplexed channels λ2-λ8 and the multiplexed channels λ9-λn from UPG port 1016. WDM filter 1010 multiplexes the multiplexed channels λ2-λ8, λ9-λn and channel λ1 from λ1 I/O port 1012. The multiplexed channels λ1-λn is directed to thin-film tap filter 1006. The incoming signal having multiplexed channels λ1-λn is partially transmitted through thin-film tap filter 1006 to a Mux tap port 1046. Mux tap port outputs a Mux tap signal having all channels λ1-λn. Thin-film tap filter 1006 partially reflects multiplexed signal 1004A having all channels λ1-λn to common port 1002. Common port 1002 outputs multiplexed signal 1004A.

It is appreciated that a prism or a plurality of prisms including a wedge prism may be included in BiDi Mux/DeMux 1000 to arrange DeMux tap port, Mux tap port, UPG port, and I/O ports in same manners as shown in embodiments of FIGS. 7-9.

Figure 12:
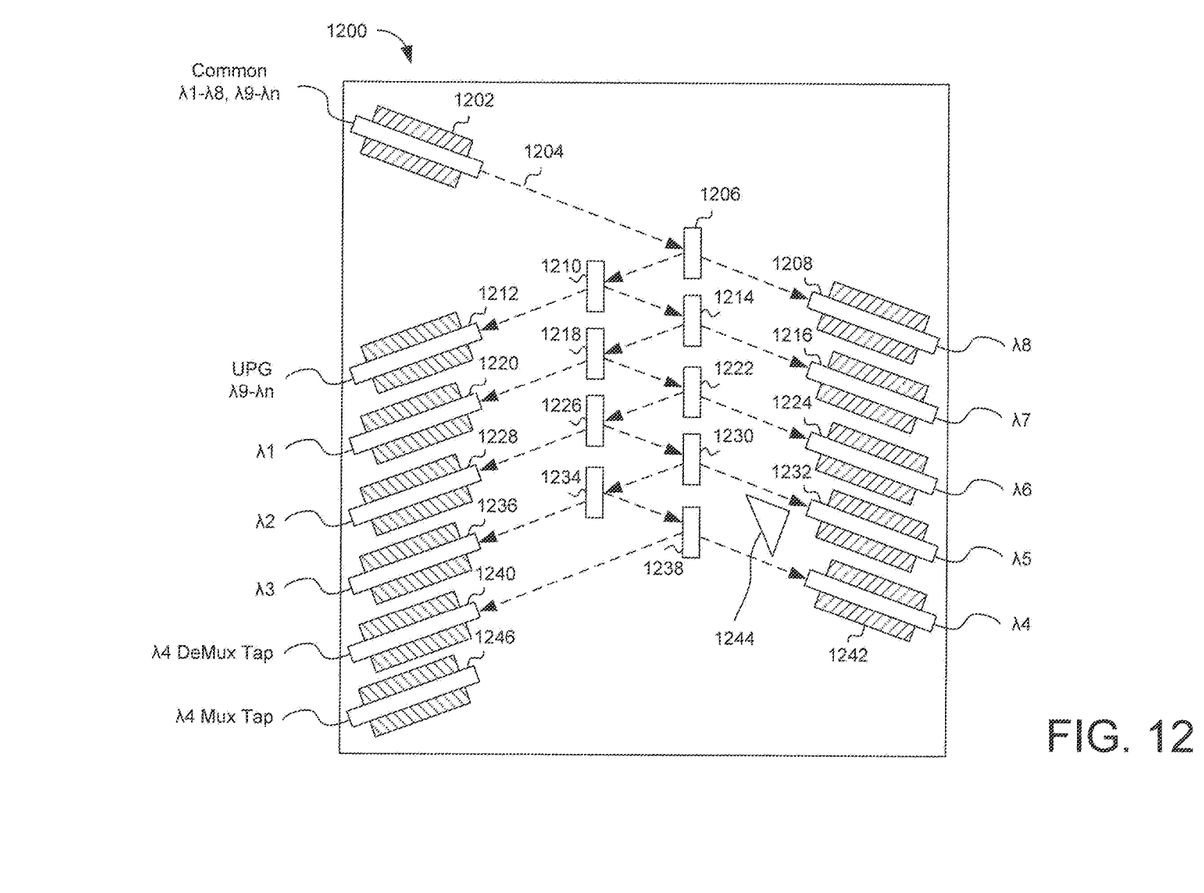
FIG. 12 shows a BiDi Mux/DeMux that taps an individual CWDM channel in demultiplexing mode.

FIG. 12 shows a BiDi Mux/DeMux 1200 that taps an individual CWDM channel instead of the multiplexed signal in accordance with an embodiment of the invention. The individual CWDM channel is tapped using a thin-film tap filter disposed at the farthest position relative to the common port as compared with a plurality of WDM filters. Since any channel and its WDM filter can be allocated at the position prior to the thin-film tap filter, any individual CWDM channel can be tapped in multiplexing or demultiplexing mode.

FIG. 12 shows BiDi Mux/DeMux 1200 in demultiplexing mode. Common port 1102 receives a multiplexed signal 1204, for example, having eight channels λ1-λ8 and additional n channels λ9-λn. Multiplexed signal 1204 is directed to WDM filter 1206. WDM filter 1206 selectively transmits channel λ8 to λ8 I/O port 1208, and reflects the rest of the multiplexed signal to a WDM filter 1210. WDM filter 1210 selectively transmits the multiplexed signal having (n-8) channels λ9-λn to a UPG port 1212 and reflects the rest of the multiplexed signal to a WDM filter 1214. The signal exiting from UPD port 1212 may be used for further demultiplexing or a second stage of demultiplexing. WDM filter 1214 selectively transmits channel λ7 to λ7 I/O port 1216 and reflects the rest of the multiplexed signal to a WDM filter 1218. WDM filter 1218 selectively transmits channel λ1 to λ1 I/O port 1220 and reflects the rest of the multiplexed signal to a WDM filter 1222. WDM filter 1222 selectively transmits channel λ6 to λ6 I/O port 1224 and reflects the rest of the multiplexed signal to a WDM filter 1226. WDM filter 1226 selectively transmits channel λ2 to λ2 I/O port 1228 and reflects the rest of the multiplexed signal to a WDM filter 1230. WDM filter 1230 selectively transmits channel λ5 to λ5 I/O port 1232 and reflects the rest of the multiplexed signal to a WDM filter 1234. WDM filter 1234 selectively transmits channel λ3 to λ3 I/O port 1236 and reflects the rest of the multiplexed signal, which contains only one channel λ4 to a thin-film tap filter 1238. Incoming signal of channel λ4 is partially reflected by thin-film tap filter 1238 to a λ4 DeMux tap port 1240 and partially transmitted to and entering a last λ4 I/O port 1242. In this manner, channel λ4 is tapped from λ4 DeMux tap port 1240.

Figure 13:
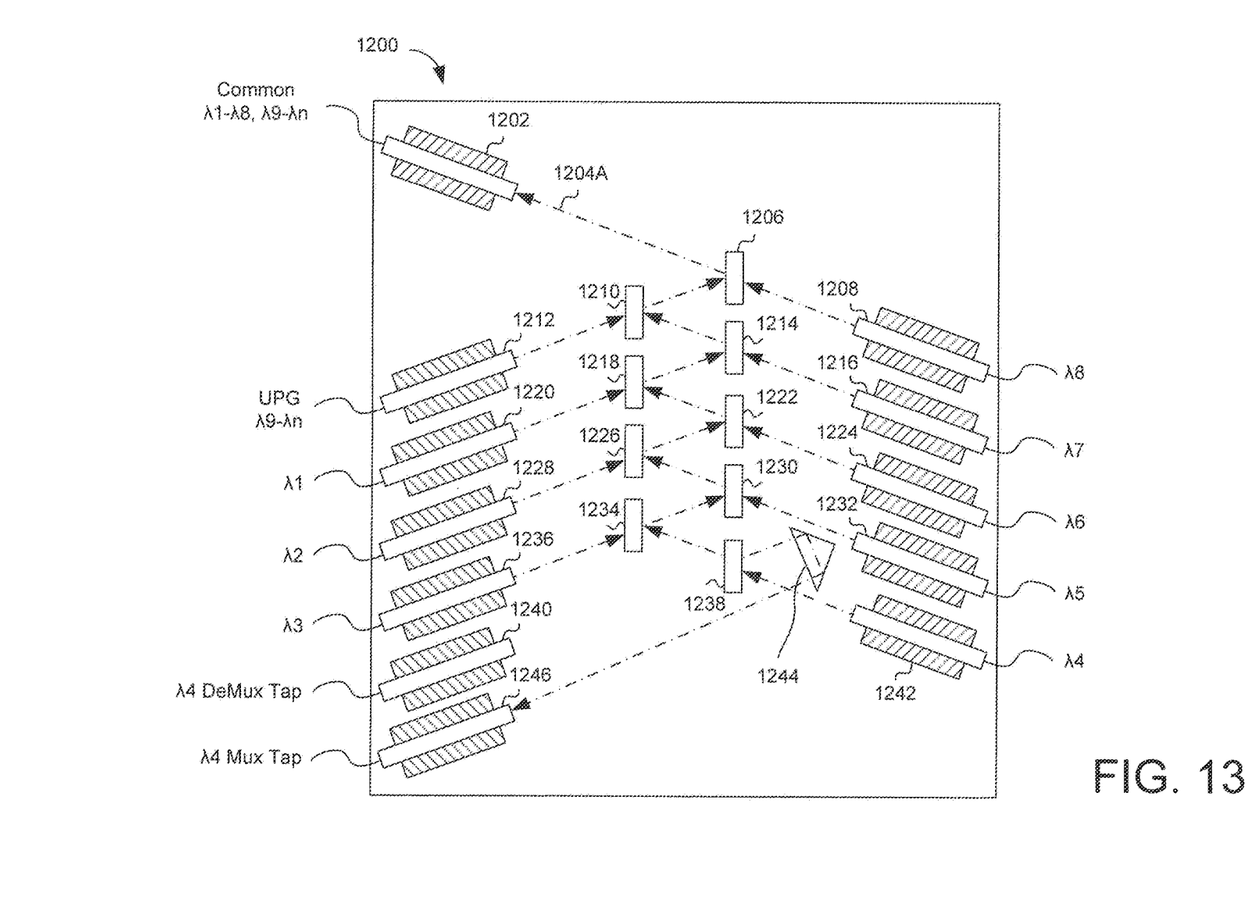
FIG. 13 shows the BiDi Mux/DeMux of FIG. 12 in multiplexing mode.

FIG. 13 shows BiDi Mux/DeMux 1200 of FIG. 12 in multiplexing mode, in accordance with an embodiment of the present invention. Incoming signal of channel λ4 exiting from last λ4 I/O port 1242 is partially reflected by thin-film tap filter 1238 to a prism 1244. Prism 1244 reflects signal of channel λ4 twice and directed the signal to a λ4 Mux tap port 1246. In this manner, channel λ4 is tapped from λ4 Mux tap port 1246. WDM filter 1234 multiplexes, i.e., combines, channel λ4 from λ4 I/O port 1242 passing through thin-film tap filter 1238 and channel λ3 from λ3 I/O port 1236. WDM filter 1230 multiplexes the multiplexed channels λ3-λ4 and channel λ5 from λ5 I/O port 1232. WDM filter 1226 multiplexes the multiplexed channels λ3-λ5 and channel λ2 from λ2 I/O port 1228. WDM filter 1222 multiplexes the multiplexed channels λ2-λ5 and channel λ6 from λ6 I/O port 1224. WDM filter 1218 multiplexes the multiplexed channels λ2-λ6 and channel λ1 from λ1 I/O port 1220. WDM filter 1214 multiplexes the multiplexed channels λ1-λ6 and channel λ7 from λ7 I/O port 1216. WDM filter 1210 multiplexes the multiplexed channels λ1-λ7 and the multiplexed channels λ9-λn from UPG port 1212. WDM filter 1206 multiplexes the multiplexed channels λ1-λ7, λ9-λn and channel λ8 from λ8 I/O port 1208. The multiplexed channels λ1-λn, shown as a multiplexed signal 1204A, is directed to common port 1202. Common port 1202 outputs multiplexed signal 1204A.

Comparing with a traditional uni-directional Mux/DeMux using fused couplers, a BiDi Mux/DeMux using CWDM filters integrated with a BiDi thin-film tap filter has more compact dimension package, and this compact dimension will benefit the module integration and OSP (outside plant) outdoor tray routing. The compact BiDi Mux/DeMux using CWDM filters integrated with a BiDi thin-film tap filter is suitable for high speed network since it is dispersionless, as compared with traditional CWDM filters spliced with fused couplers for tapping, which is suitable for low speed network only. The device can be integrated with a BiDi tap in a smart way to rearrange the optical path so as to make it suitable for BiDi multiplexing and demultiplexing modes to benefit the flexible and versatile monitoring and debugging purpose in nowadays high speed networks.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A bi-directional multiplexer/demultiplexer comprising:
   a common port, wherein the common port receives a multiplexed signal in demultiplexing mode and outputs a multiplexed signal in multiplexing mode;
   a plurality of input/output ports, wherein an input/output port outputs a channel in demultiplexing mode and inputs a channel in multiplexing mode;
   a plurality of compact wavelength division multiplexing (CWDM) filters arranged in a zig-zag fashion, wherein a CWDM filter selects a channel for each input/output port in demultiplexing mode and adds a channel from each input/output port in multiplexing mode; and
   a bi-directional thin-film tap filter, wherein:
      the bi-directional thin-film tap filter receives a multiplexed signal from the common port in demultiplexing mode and from a first CWDM filter of the plurality of CWDM filters in multiplexing mode;
      the bi-direction thin-film tap filter transmits a portion of the multiplexed signal to the first CWDM filter of the plurality of CWDM filters and reflects a portion of the multiplexed signal as a DeMux tap signal in demultiplexing mode, wherein the portion of the multiplexed signal and the DeMux tap signal comprises all channels received by the bi-directional thin-film tap filter; and
      the bi-directional thin-film tap filter reflects a portion of the multiplexed signal as a Mux tap signal and transmits a portion of the multiplexed signal to a the common port in multiplexing mode, wherein the portion of the multiplexed signal and the Mux tap signal comprises all channels received by the bi-directional thin-film tap filter.

2. The bi-directional multiplexer/demultiplexer of claim 1 further comprising: an upgrade (UPG) port for outputting multiplexed channels for further demultiplexing in demultiplexing mode, and inputting multiplexed channels in multiplexing mode.

3. The bi-directional multiplexer/demultiplexer of claim 1, wherein the bi-directional thin-film tap filter is one of a cubic beamsplitter and half-mirror.

4. The bi-directional multiplexer/demultiplexer of claim 1, wherein the bi-directional thin-film tap filter directs a demultiplexing tap signal tapped from an incoming signal from the common port to the demultiplexing tap port in demultiplexing mode and a multiplexing tap signal tapped from an incoming signal combined by the CWDM filters to a multiplexing tap port in multiplexing mode.

5. The bi-directional multiplexer/demultiplexer of claim 4, wherein a power of the tapped signal is ranging from 1% to 99% of an incoming signal.

6. The bi-directional multiplexer/demultiplexer of claim 1 further comprising:
   a wedge prism wherein the wedge prism bends a light path directed from the bi-directional thin-film tap filter to the multiplexing tap port, and the multiplexing tap port is parallel to input/output ports on a side opposite to the common port.

7. The bi-directional multiplexer/demultiplexer of claim 1 further comprising:
   a prism wherein the prism reflects a light path twice directed from the bi-directional thin-film tap filter to the multiplexing tap port, and the multiplexing tap port is parallel to the demultiplexing tap port and input/output ports on a same side as the common port.

8. The bi-directional multiplexer/demultiplexer of claim 1 further comprising:
   a first wedge prism wherein the first wedge prism bends a light path directed from the bidirectional thin-film tap filter to the multiplexing tap port;
   a prism wherein the prism reflects a light path twice directed from the bi-directional thin-film tap filter to the demultiplexing tap port; and
   a second wedge prism wherein the second wedge prism bends the light path reflected twice by the prism directed from the bi-directional thin-film tap filter to the demultiplexing tap port, and the demultiplexing tap port is parallel to the multiplexing tap port and input/output ports on a side opposite the common port.

9. The bi-directional multiplexer/demultiplexer of claim 1, wherein the bi-directional thin-film tap filter is disposed at a farthest position relative to the common port as compared with the plurality of CWDM filters, the bi-directional thin-film tap filter directs a tapped signal from an incoming signal entering a last input/output port to the demultiplexing tap port in demultiplexing mode and a tapped signal from an incoming signal exiting from last input/output port to the multiplexing port in multiplexing mode, and the tapped signal contain a channel only.

10. The bi-directional multiplexer/demultiplexer of claim 9 wherein a power of the tapped multiplexed signal is ranging from 1% to 99% of the incoming signal.

11. A bi-directional multiplexer/demultiplexer comprising:
   a common port, wherein the common port receives a multiplexed signal in demultiplexing mode and outputs a multiplexed signal in multiplexing mode;
   a plurality of input/output ports, wherein an input/output port outputs a channel in demultiplexing mode and inputs a channel in multiplexing mode;
   a plurality of CWDM filters arranged in a zig-zag fashion, a CWDM filter selects a channel for each input/output port in demultiplexing mode and adds a channel from each input/output port in multiplexing mode;
   an upgrade (UPG) port, wherein the UPG port outputs multiplexed channels for further demultiplexing in demultiplexing mode, and inputs multiplexed channels in multiplexing mode;
   a CWDM filter selects multiplexed channels for UPG port in demultiplexing mode and adds multiplexed channels from UPG port in multiplexing mode; and
   a bi-directional thin-film tap filter, wherein:
      the bi-directional thin-film tap filter receives an incoming signal from the common port in demultiplexing mode and from a first CWDM filter of the plurality of CWDM filters in multiplexing mode;

the bi-direction thin-film tap filter transmits a portion of a tapped multiplexing signal from an incoming signal to the first CWDM filter of the plurality of CWDM filters and reflects a portion of a tapped multiplexing signal from an incoming signal as a DeMux tap signal in demultiplexing mode, wherein the portion of the tapped multiplexed signal and the DeMux tap signal comprises all channels received by the bi-directional thin-film tap filter; and the bi-directional thin-film tap filter reflects a portion of the tapped multiplexing signal from an incoming signal as a Mux tap signal and transmits a portion of the tapped multiplexing signal from an incoming signal to a the common port in multiplexing mode, wherein the portion of the tapped multiplexed signal and the Mux tap signal comprises all channels received by the bi-directional thin-film tap filter.

12. The bi-directional multiplexer/demultiplexer of claim 11 further comprising: a. wedge prism wherein the wedge prism bends a light path directed from the bi-directional thin-film tap filter to the multiplexing tap port, and the multiplexing tap port is parallel to input/output ports on a side opposite to the common port.

13. The bi-directional multiplexer/demultiplexer of claim 11 further comprising:

a prism wherein the prism reflects a light path twice directed from the bi-directional thin-film tap filter to the multiplexing tap port, and the multiplexing tap port is parallel to the demultiplexing tap port and input/output ports on a same side as the common port.

14. The bi-directional multiplexer/demultiplexer of claim 11 further comprising:

a first wedge prism wherein the first wedge prism bends a light path directed from the bi-directional thin-film tap filter to the multiplexing tap port;

a prism wherein the prism reflects a light path twice directed from the bi-directional thin-film tap filter to the demultiplexing tap port; and a second wedge prism wherein the second wedge prism bends the light path reflected twice by the prism directed from the bi-directional thin-film tap filter to the demultiplexing tap port, and the demultiplexing tap port is parallel to the multiplexing tap port and input/output ports on a side opposite the common port.

15. A bi-directional multiplexer/demultiplexer comprising:

a common port, wherein the common port receives a multiplexed signal in demultiplexing mode and outputs a multiplexed signal in multiplexing mode;

a plurality of input/output ports, wherein an input/output port outputs a channel in demultiplexing mode and input a channel in multiplexing mode;

a plurality of CWDM filters arranged in a zig-zag fashion, a CWDM filter selects a channel for each input/output port in demultiplexing mode and adds a channel from each input/output port in multiplexing mode;

a bi-directional thin-film tap filter, wherein:

a bi-directional thin-film tap filter is disposed at a farthest position from the common port as compared with the plurality of CWDM filters;

the bi-directional thin-film tap filter partially reflects a tapped signal from an incoming signal entering a last input/output port to the demultiplexing tap port and partially transmits the tapped signal from an incoming signal entering a last input/output port to the last input/output port in demultiplexing mode, wherein the tapped signal comprises all channels received by the bi-directional thin-film tap filter; and the bi-directional thin-film tap filter partially transmits a tapped signal from an incoming signal exiting a last input/output port to the plurality of CWDM filters and partially reflects the tapped signal from an incoming signal exiting a last input/output port to the multiplexing tap port in multiplexing mode, wherein the tapped signal comprises all channels received by the bi-directional thin-film tap filter.

\* \* \* \* \*

UNITED STATES PATENT AND TRADEMARK OFFICE
CERTIFICATE OF CORRECTION

PATENT NO. : 9,590,759 B1
APPLICATION NO. : 14/332387
DATED : March 7, 2017
INVENTOR(S) : Xiaotao Peng et al.

Page 1 of 1

It is certified that error appears in the above-identified patent and that said Letters Patent is hereby corrected as shown below:

In the Claims

Column 11, Claim 11, Line 3:
"the bi-direction thin-film tap filter transmits a portion of"
Should read:
--the bi-directional thin-film tap filter transmits a portion of--;

Column 11, Claim 11, Line 16:
"signal to a the common port in multiplexing mode,"
Should read:
--signal to the common port in multiplexing mode,--;

Column 11, Claim 12, Line 21:
"11 further comprising: a. wedge prism wherein the wedge"
Should read:
--11 further comprising: a wedge prism wherein the wedge--; and Column 12, Claim 15, Line 14:
"input a channel in multiplexing mode;"
Should read:
--inputs a channel in multiplexing mode,--.

Signed and Sealed this
Seventh Day of November, 2017

Joseph Matal
*Performing the Functions and Duties of the
Under Secretary of Commerce for Intellectual Property and
Director of the United States Patent and Trademark Office*